March 19, 1957  E. E. GAHLER  2,785,762
BELT TIGHTENING DRIVE CONTROL MEANS FOR TRACTOR
Filed May 7, 1952  2 Sheets-Sheet 1

INVENTOR
Edgar E. Gahler
BY Robert M. Dunning

March 19, 1957 E. E. GAHLER 2,785,762
BELT TIGHTENING DRIVE CONTROL MEANS FOR TRACTOR
Filed May 7, 1952 2 Sheets-Sheet 2

INVENTOR
Edgar E. Gahler
BY Robert M. Dunning
ATTORNEY

United States Patent Office 2,785,762
Patented Mar. 19, 1957

2,785,762

BELT TIGHTENING DRIVE CONTROL MEANS FOR TRACTOR

Edgar E. Gahler, St. Paul, Minn.

Application May 7, 1952, Serial No. 286,586

1 Claim. (Cl. 180—27)

This invention relates to an improvement in belt tightening drive control means for a tractor and deals particularly with a low cost tractor useful for cultivating and the like.

Various types of devices have been produced for cultivating crops. Certain of these are so-called "hand cultivators" which may be controlled by an operator walking behind the apparatus. The present device comprises a tractor which may be produced at low cost through the use of surplus materials and used automobile parts which may be obtained at relatively low cost.

A feature of the present invention resides in the provision of a tricycle type tractor which is supported by three wheels arranged in generally triangular relationship. The two rear wheels are spaced sufficiently to straddle two rows of corn or other material to be cultivated while the front wheel is arranged on a plane substantially mid-way between the planes of the rear wheels. The operator is positioned substantially between the rear wheels and is thus longitudinally aligned with the central front wheel. As a result the operator may readily see the rows being cultivated and guide the tractor accordingly.

A feature of the present invention resides in the simplicity with which the motor is supported. The motor comprises a relatively low power gasoline engine which is hingedly supported at one side upon a hinge extending longitudinally of the tractor. A transmission and drive shaft are connected to the rear axle housing preferably through the differential normally employed in such axles. The transmission and drive shaft are supported in fixed position upon the frame and a pulley is provided adjacent the transmission by means of which the drive shaft may be actuated. One or more belts connect this pulley with a cooperable pulley on the drive shaft of the engine. Means are provided for hinging the free side of the engine upwardly and downwardly in order to tighten or loosen the belts. This provides a belt tightener between the engine and the drive shaft and greatly reduces the cost of construction.

A feature of the present invention resides in the specific manner in which the free side of the motor is supported for movement. A bell crank lever is hinged intermediate its ends to the vehicle frame. A link is pivotally connected to one end of this bell crank lever and to the engine. The connected end of the bell crank lever and the link form a toggle joint in which these two parts may move into or out of alignment. When aligned or pivoted slightly past dead center they provide a rigid connection which firmly supports the motor and prevents the movement of the tractor and vibration of the motor from loosening the belts.

A further feature of the present invention resides in the provision of an engine support in which one side of the engine is pivotally connected to the frame and the opposite side thereof is connected to the frame through a toggle joint connection. Resilient means are provided for counter-balancing the weight of the engine so that the toggle levers tend to pivot into alignment. As a result the operator must work against spring pressure to lower the engine and to loosen the drive belts.

An added feature of the present invention resides in the provision of a tractor with a motor mounting which includes a resilient motor support and a belt tightening pedal. The bell crank lever which forms a part of the toggle joint may be extended to form a belt tightening pedal so that the toggle joint may be broken by an action similar to that used in depressing a clutch pedal of an automotive vehicle.

These and other objects and novel features of my invention will be more clearly and fully set forth in the following specification and claims.

In the drawings forming a part of my specification:

Figure 1:
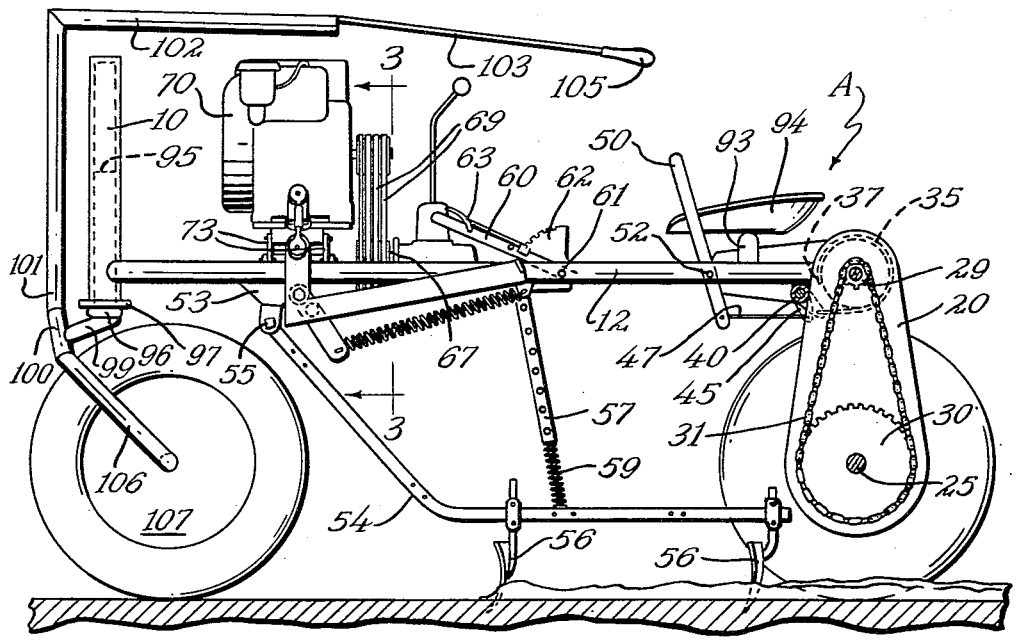
Figure 1 is a side elevational view of the tractor, one wheel thereof being broken away on the line 1—1 of Figure 2 to clarify the illustration.

The tractor is indicated in general by the letter A. The tractor includes a frame having a vertical supporting post 10 having a pair of rearwardly diverging frame members 11 and 12 connected thereto. The rear ends of the frame members 11 and 12 are connected to the rear axle housing 13. These parts may be welded or otherwise fixed together and are preferably of material which can be purchased at low cost. For example, pipes or tubing are employed to form the vertical pivot post 10 and the frame members 11 and 12. The axle housing 13 is of the type often used in passenger cars and may be removed from a wrecked or junked automobile.

The rear axle housing 13 includes an enlarged central chamber 14 which encloses the differential gearing. The differential gearing acts to connect a longitudinally extending drive shaft 15 to a pair of oppositely directed axle shafts 16 and 17. As differentials of the type in question are well known in the art, the details are not illustrated.

A pair of substantially parallel vertical plates 19 and 20 are welded or otherwise connected to the end flanges 21 and 22 of the axle housing 13. Tubular braces 23 and 24 may connect these plates 19 and 20 to the axle housing so as to assist in supporting the same in vertical parallel relationship. The plates 19 and 20 support laterally extending stub shafts such as 25 which extend outwardly in axially aligned relationship from the supporting plates 19 and 20. Wheels 26 and 27 are supported by the respective shafts 25 for rotation in unison therewith.

A sprocket 29 is secured to the outer end of each of the axle shafts 16 and 17 and a cooperable sprocket 30 is supported upon each of the stub shafts 25. A chain 31 connects the sprocket on the axle shaft 16 to the shaft 25 connected to the wheel 26 and acts to drive this wheel. A chain 32 connects the opposite shaft 17 to the corresponding stub shaft 25 to rotate the wheel 27.

A brake drum 33 is mounted upon the axle shaft 16 for rotation therewith and a similar brake drum 34 is mounted upon the opposite shaft 17. Brake bands 35 and 36 respectively encircle the brake drums 33 and 34 and are cooperable therewith. One end of each brake drum is dead ended as indicated at 37 in Figure 1 while the opposite end is connected to an arm by means of which it may be tightened upon its drum. An arm 39 is supported upon a rocker shaft 40 transversely supported by the vehicle frame. A similar operating arm 41 is pivotally supported upon a rocker arm 42 supported transversely of the frame. The rocker arms 40 and 42 are preferably aligned and enclosed within tubular housings 43 and 44 respectively.

An arm 45 is mounted upon the rocker arm 40 and a similar arm 46 is mounted upon the rocker arm 42. Links 47 and 49 connect these operating arms 45 and 46 to brake levers 50 and 51 which are pivotally connected to the frame as indicated at 52 in Figure 1. It will be seen from Figure 1 of the drawings that by rotating either of the levers 50 or 51 in a clockwise direction as viewed in this figure, the corresponding brake bands may be tightened upon their respective drums.

The brake bands and brakes thus provided serve the double purpose of simplifying the turning of the vehicle and as a means of slowing the vehicle upon down hill travel. The manner in which the brakes simplify the steering operation will be later described.

Figure 2:
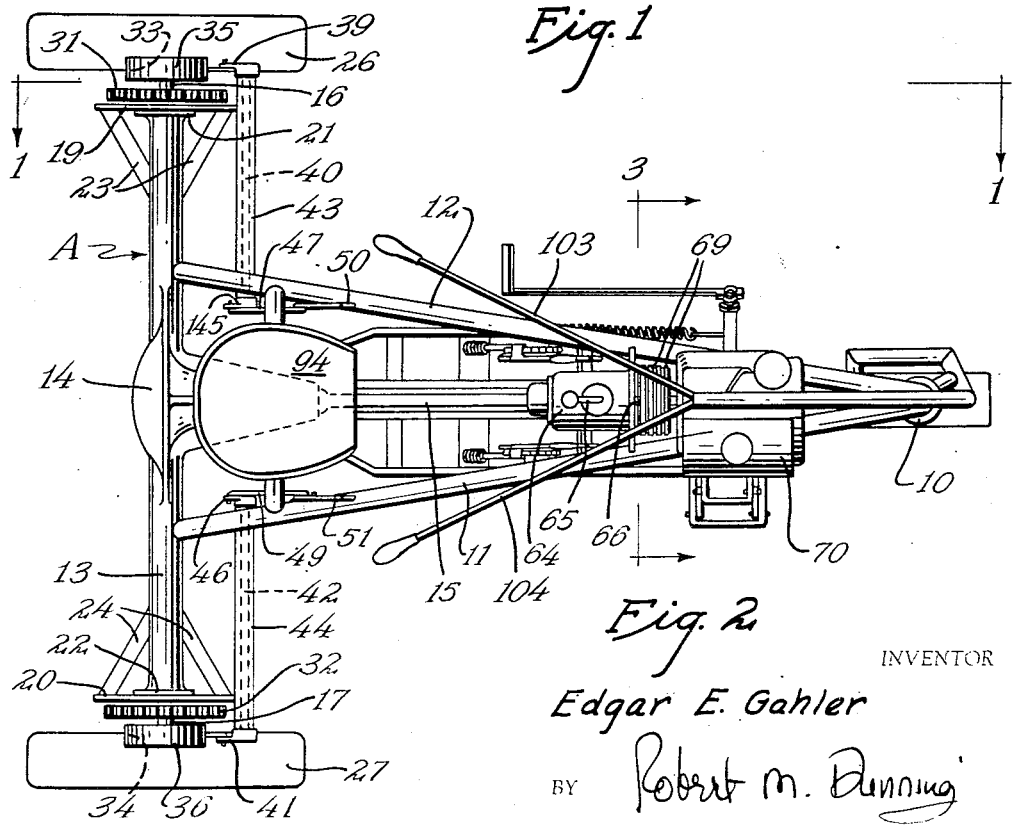
Figure 2 is a top plan view of the tractor.

A pair of brackets 53 are supported by the frame members 11 and 12 in transversely aligned relation. A cultivator shovel supporting frame 54 is hingedly secured at 55 to the brackets 53 and is swingable about a transverse pivot. A cultivator shovel 56 or other suitable implement may be supported by the cultivator frame. A line 57 which may include a resilient section 59 connects the cultivator shovel frame 54 to a lever 60 pivotally supported at 61. A quadrant 62 and latch mechanism 63 are provided for holding the link 57 at a desired elevation and to raise and lower the cultivator shovel supporting frame 54. As best indicated in Figures 1 and 2 of the drawings the main drive shaft 15 is connected at its rear end to differential gearing within the differential housing portion 14. The forward end of this drive shaft may be connected through a universal joint if desired to a transmission unit within the transmission casing 64. The transmission may be of any suitable type and the position of the gears may be regulated by means of a conventional shift lever 65.

A shaft 66 extends forwardly from the transmission casing 64 and acts to support a pulley 67. The pulley 67 is preferably provided with a plurality of V-shaped grooves to accommodate a series of V-belts 69. These belts act to drive the pulley 67 in a manner which will now be described.

The tractor is driven by means of an internal combustion engine indicated in general by the numeral 70. The motor is normally a relatively low horsepower unit which is self-contained or in other words, supports its own fuel tank, electrical system, and the like. The motor 70 drives a drive shaft 71 which acts to support a pulley 72 similar to the pulley 67. The pulleys 72 and 67 are arranged so that the belts 69 may operate continuously in the same plane.

A bracket 73 is welded or otherwise secured to the frame member 11 to project laterally therefrom. A pair of bracket arms 74 are pivotally attached to this bracket 73 at 75. The bracket arms 74 may be connected together if desired to hold the same in proper spaced relationship. A suitable bracket 76 is secured to the lower part of the engine 70 to extend laterally therefrom. The links 74 are pivotally connected to the bracket 76 at 77. Thus the engine may pivot upwardly and downwardly.

Figure 3:
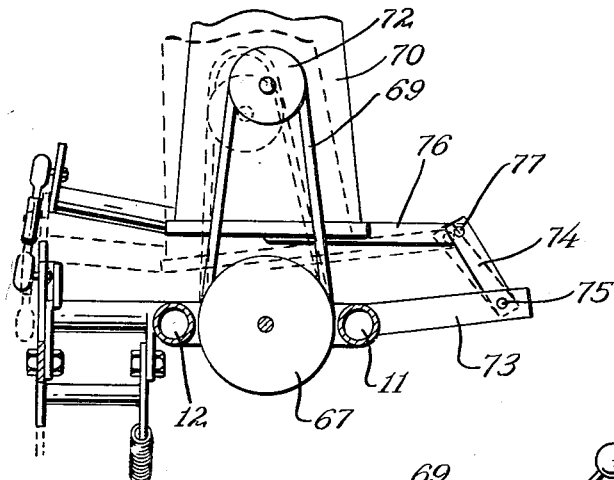
Figure 3 is a sectional detail of the motor support, the position of the section being indicated by the line 3—3 of Figure 1.
Figure 4:
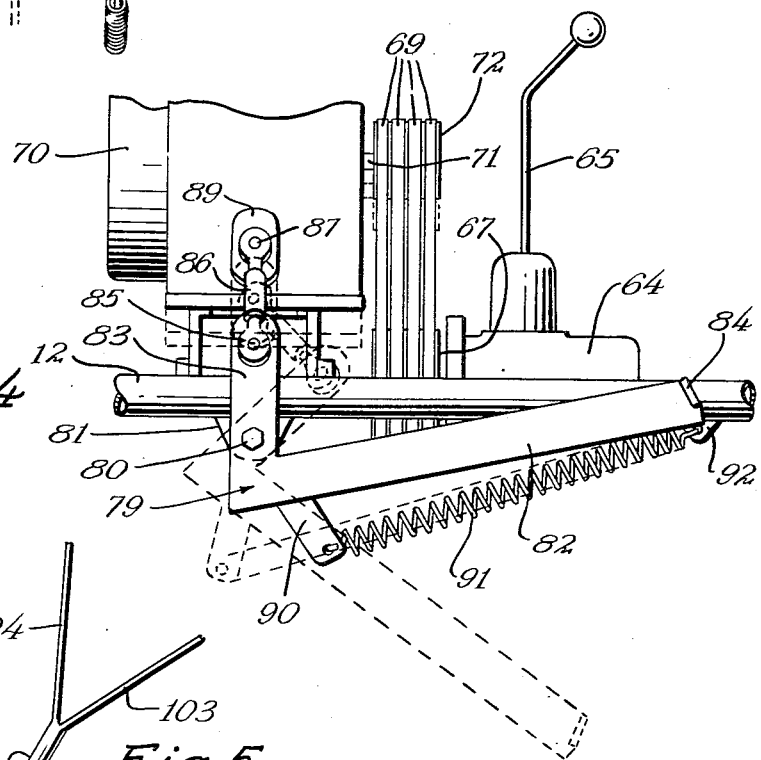
Figure 4 is an enlarged side elevation view of a portion of the motor support showing the construction thereof.

As best indicated in Figure 4 of the drawings, a bell crank lever 79 is pivotally connected at 80 to a fixed bracket 81 mounted upon the frame member 12. One arm 82 of the lever 79 extends angularly with repect to the other arm 83 and is provided with a foot pedal in the form of an outwardly turned arm 84 at its free end. The other arm 83 of the lever 79 is pivotally connected at 85 to an adjustable link 86 pivotally connected at 87 to a motor bracket 89. The pivot 85 may swing into alignment with the pivots 80 and 87 or may pivot slightly past dead center so as to form a rigid connection. In other words, when the lever end 83 and the link 86 are aligned, the weight of the motor, the upward and downward strain on the motor due to vibration and movement of the tractor, are supported by a rigid connection. However, by swinging the lever 79 in a clockwise direction into the position shown in dotted outline in Figure 4 of the drawings, the alignment between the lever and the link is broken, allowing the motor 70 to swing downwardly. As a result of this movement the distance between the pulleys 72 and 67 is shortened as indicated in Figure 3 so that the motor will not drive the pulley 67.

An arm 90 is connected to the lever 79 to rotate in unison therewith. A spring 91 connects the arm 90 to a lug 92 mounted on the frame member 12. This spring 91 tends to rotate the lever 79 in a counter-clockwise direction toward the extreme position. In the extreme position of the lever 79 the end 83 thereof is aligned with the link 86 or is slightly past dead center so that a rigid support is provided between the frame and the motor. The spring 91 resists the downward swinging of the pedal end 82 of the lever 79 and counter-balances the weight of the motor. Thus the structure forms a simple type of clutch which acts much in the manner of a conventional clutch.

A cross member 93 connects the diverging frame members 11 and 12 near their rear ends and a seat 94 is mounted on this cross member in any suitable manner. The seat may be supported on springs if desired, but in the simple form of construction illustrated the seat is merely welded or bolted to the cross member 93.

At the forward end of the tractor, I provide a stub shaft 95 which extends upwardly into the bearing 10 and is rotatable on a substantially vertical axis therein. The shaft 95 is provided with a shoulder 96 at its lower extremity to limit the upward movement. A bearing plate or other type of bearing 97 is provided at the lower end of the member 10 to resist the upward force of the collar 96. An arm 99 extends downwardly at an angle from the collar 96 and joins the inclined connecting portion 100 which is connected to the lower end of the vertical steering post 101.

Figure 5:
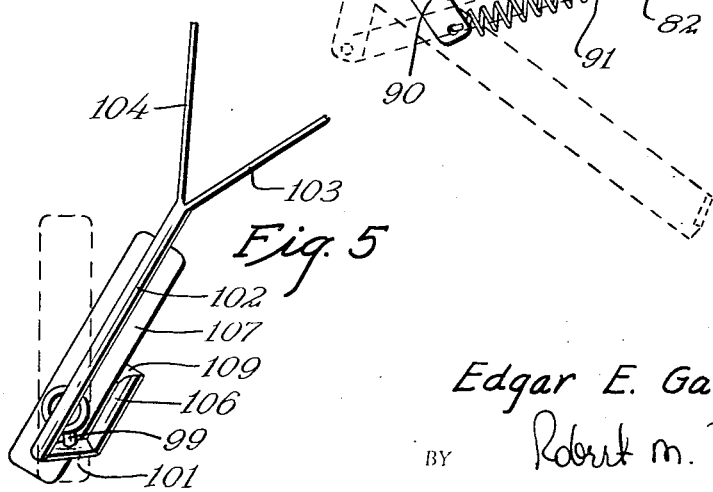
Figure 5 is a diagrammatic top plan view of the forward portion of the tractor illustrating the manner in which the steering wheel is pivotally supported.

The steering apparatus includes the vertical post 100 having a longitudinally extending bar 102 at its upper extremity. A pair of rearwardly diverging handle bars 103 and 104 are connected to the rear extremity of the bar 100 and include handle grips 105 by means of which the handle bars may be grasped for movement. The inclined portion 100 is connected to the lower end of the vertical post 101 and connects the post with a downwardly and rearwardly inclined arm 106 which is arranged in a plane parallel to, but spaced from, the longitudinal plane vertically through the center of the tractor. This arrangement may be seen in Figure 5 of the drawings in which the arm 106 is shown parallel to the front wheel 107. The lower extremity of the arm 106 extends transversely at 109 to support the wheel bearing of the front wheel 107.

This arrangement provides a low cost front wheel supporting structure which simplifies the task of removing the wheel if required and also supports the axis of the wheel rearwardly from the pivot post 10. When the handle bars 103 and 104 are swung to one side or to the other, the shaft 95 rotates within the post 10 and the wheel 107 is swung about the axis of the shaft 95. Actually as the lower center of the wheel is resting upon the ground, the wheel will pivot about a vertical axis through the center of the wheel and the movement of the handle bars will shift the forward part of the tractor frame to one side or to the other. It will be seen that when the handle bars are turned at a relatively sharp angle, the tractor may turn around in an extremely short space.

The steering mechanism thus described may be readily combined with the braking system in turning the tractor. By operating the lever 50 and swinging the handle bars in a counterclockwise direction as viewed in Fig. 2, the rear wheel 26 may be held stationary, the differential acting to rotate the wheel 27 at an increased rate of speed. The entire tractor may in this way be swung about the center of the wheel 26 so that the tractor may be turned around within its own length. In a similar manner the wheel 27 may be held stationary and the handle bars turned in a clockwise direction as viewed in Figure 2 if it is desired to turn in the opposite direction. This feature is of importance in a tractor of the type described, as such a structure is ordinarily used on relatively small farms where the use of a larger and more expensive tractor is not economical. The ability to turn the tractor around in an extremely short space permits the maximum use of the land for farming purposes.

I have described the general construction of the tractor and the fact that the frame is sufficiently high to permit the device to straddle plants until they are of considerable height. I have also described the simple manner in which the motor is mounted so that the movement of the motor itself may be employed to tighten or loosen the drive belts and thus to act as a clutch. While the idea of changing the distance between pulleys to permit or prevent slippage is probably old in the art, the use of a toggle joint to provide a rigid motor mounting in one position of the clutch is believed novel and advantageous.

The front wheel support and the manner in which the apparatus may be steered is also of importance in the present device. Most of the parts employed are available at relatively low cost and the more complicated parts are available from junked or wrecked automobiles. The transmission differential and rear axle requires little modification and the device functions with high efficiency and at low cost. Obviously the tractor thus formed has limitations in use and can not pull heavy implements in the manner of large tractors, but on the other hand may be operated at a much lower cost and functions more effectively for certain purposes than a large and expensive tractor.

The steering arrangement illustrated has several unusual features. In cultivating a row of plants, it is desirable to cultivate close to the plants. If the row is somewhat uneven, it is difficult to manipulate the usual cultivator to accomplish the desired result. With the present device, swinging the handle bars in one rotative direction actually moves the forward end of the cultivator frame in the opposite direction as the cultivator swings about the center of the front wheel which is off-set from the pivot point of the handle bars. Thus the cultivator blades may be instantaneously moved to one side or the other a distance usually sufficient to permit the close cultivation of the plants.

It will be noted that the seat is positioned some distance from the pivot point of the handle bars, and it would seem that considerable arm movement would be necessary in order to turn the tractor about the vertical axis of one back wheel. Actually, however, the handle bars automatically swing to the proper extent when the brake is applied to one rear wheel if the handle bars are permitted to swing. In other words, when one rear wheel stops movement a thrust is exerted against the vertical pivot point of the front steering wheel, tending to swing the front of the tractor frame laterally. The front wheel acts as a caster wheel to swing the handle bars into substantially right angular position if the handle bars are not manually restrained from swinging. As a result, little effort is required to turn the tractor through ninety or one hundred eighty degrees. As soon as the brake action on the rear wheel is released, the lateral thrust on the front of the tractor frame is relieved and the movement of both rear wheels tends to drive the tractor straight ahead. The front wheel again acts as a caster wheel and swings the handle bars in a reverse direction. Thus both the turning operation and the straightening operation at the end of the turn are accomplished automatically by action of the brakes on the rear wheels.

In accordance with the patent statutes, I have described the principles of construction and operation of my tractor, and while I have endeavored to set forth the best embodiment thereof, I desire to have it understood that obvious changes may be made within the scope of the following claims without departing from the spirit of my invention.

I claim:

A tractor including in combination a frame, a forward guide wheel, drive wheels supported by said frame, a drive shaft connected to said wheels for actuating the same, an engine, pivot means pivotally supporting said engine, a pulley supported by said engine, a cooperable pulley on said drive shaft, the axes of said pulleys being parallel to the axis of said pivot means, belts connecting said pulleys, foot operated toggle means for pivoting said motor to move said pulleys toward or away from one another while maintaining the pulley axes parallel, and resilient means connected to said toggle means for counter balancing the weight of said engine and urging said toggle means into alignment to effect rigid support between said frame and said engine and driving of said pulleys, said foot operated toggle means including a pair of toggle levers with one of said pair being an adjustable link moved into and out of dead center position by the other of said toggle levers.

References Cited in the file of this patent
UNITED STATES PATENTS

| | | |
|---|---|---|
| 983,256 | Coffron | Jan. 31, 1911 |
| 1,124,162 | Monahan | Jan. 5, 1915 |
| 1,154,322 | Klein | Sept. 21, 1915 |
| 1,168,956 | Nelson | Jan. 18, 1916 |
| 1,230,339 | Sweet | June 19, 1917 |
| 1,978,526 | Eppler | Oct. 30, 1934 |
| 2,166,450 | Smalley | July 18, 1939 |
| 2,247,333 | Funk | June 24, 1941 |
| 2,256,531 | Squires | Sept. 23, 1941 |
| 2,287,450 | Price | June 23, 1942 |
| 2,345,351 | Maxon et al. | Mar. 28, 1944 |
| 2,433,709 | Rogers | Dec. 30, 1947 |
| 2,619,361 | Connors | Nov. 25, 1952 |
| 2,623,603 | Cutlan et al. | Dec. 30, 1952 |
| 2,638,172 | Borchin | May 12, 1953 |
| 2,691,928 | Kelsey et al. | Oct. 19 1954 |